United States Patent Office 3,467,592
Patented Sept. 16, 1969

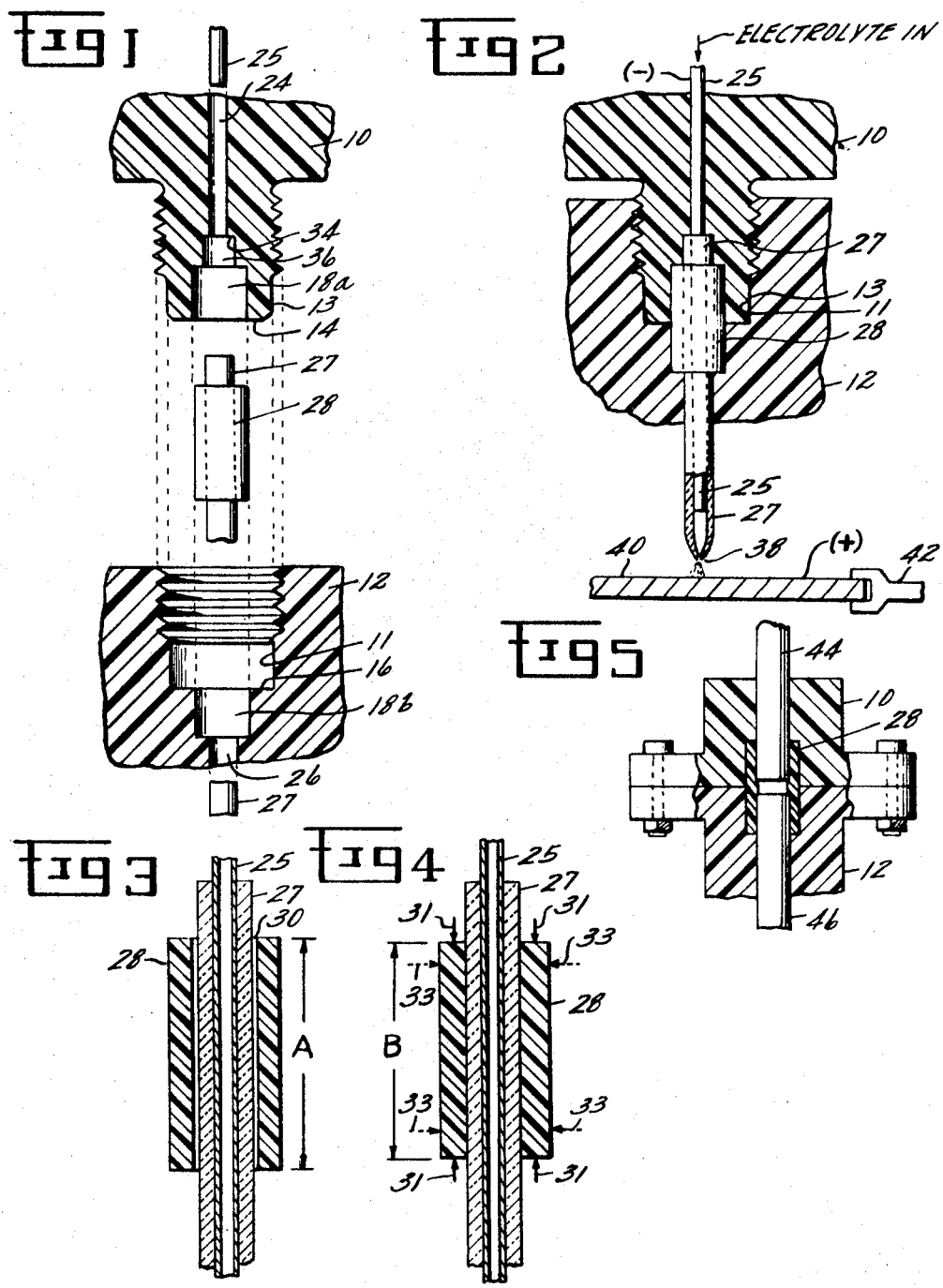

3,467,592
TUBE HOLDING MEANS FOR ELECTROCHEMICAL MACHINING APPARATUS
William Laurel Eisberg, Jr., Springdale, and Carl Eugene Hill, Loveland, Ohio, assignors to General Electric Company, a corporation of New York
Filed Apr. 14, 1966, Ser. No. 542,656
Int. Cl. B23p 1/02
U.S. Cl. 204—224       3 Claims

ABSTRACT OF THE DISCLOSURE

An improved dielectric tube holder for electrolytic machining apparatus includes a cylindrical, hollow, dielectric, elastic member functioning both as a liquid and electric seal and pressed to expand into a particularly sized and aligned cylindrical sealing chamber formed by mating portions of the holder.

---

The invention described and claimed in the United States patent application herein resulted from work done under United States Government contract FA–SS–65–17. The United States Government has an irrevocable, non-exlusive license under said application to practice and have practiced the invention claimed herein, including the unlimited right to sublicense others to practice and have practiced the claimed invention for any purpose whatsoever.

This invention relates to a tube holding fixture and, more particularly to a means for releasably securing a hollow tube such as of glass in a holding fixture for use in electrolytic machining.

Electrolytic machining generally involves the use of a cathode-tool in juxtaposition with an anode-workpiece, both of which are contacted by an electrolyte. Sufficient current is passed through the electrolyte across an electrolytic machining gap to bring about removal of material from a workpiece.

In one form of electrolytic machining, a stream of charged electrolyte is directed from a cathode toward an anodic workpiece to accomplish the electrolytic removal of material of the workpiece. Because charged electrolyte is used, one convenient means for directing electrolyte from the cathode to the anodic workpiece is a dielectric tube such as of glass positioned accurately with respect to the area on the workpiece from which material is to be removed.

The accurate positioning of the tube over the workpiece area is important for accurate material removal. Nevertheless, because the tubes are frequently made of glass breakage will occur in normal usage. Consequently, there is required a tube holder which will securely hold the tube and prevent electrolyte and hence electric current from leaking around the tube. However, the tube holder must be capable of releasing the tube for easy replacement.

In some arrangements, the O-rings were used as a seal for the electrolyte and to function as an electrical barrier. However, apparently because of the relatively small contact area, the O-ring did not function properly as an electrical barrier and electric current leaks occurred.

Therefore, it is a principal object of the present invention to provide a tube holding means which will function as an electrolyte seal as well as an electric current barrier and at the same time be capable of releasing a tube for replacement.

Another object is to provide such a tube holder which can receive and hold a variety of tube sizes.

These and other objects and advantages will be more readily recognized from the following detailed description and the drawing in which:

FIG. 1 is a fragmentary, partially sectional exploded view of one form of the tube holder of the present invention;

FIG. 2 is fragmentary, partially sectional view of the form of FIG. 1 when assembled for use and in electrolytic machining operation;

FIG. 3 is a fragmentary sectional view of a portion of the form of FIG. 1 before complete assembly;

FIG. 4 is a fragmentary sectional view of the form of FIG. 3 after complete assembly; and FIG. 5 is a partially sectional, fragmentary view of another form of the present invention.

It has been found that the above objects can be realized in electrolytic machining apparatus by providing a particularly sized recess in each of two mating portions of a tube holder, with the recesses together forming a sealing chamber. At least one of the mating portions of the tube holder has a passage therethrough communicating with but smaller than the sealing chamber. The diameter of the sealing chamber is slightly larger than a cylindrical hollow, dielectric, elastic member placed in the sealing chamber to enable a slip fit to exist between the chamber and the member. The combined length of the recesses in each member forming the sealing chamber is smaller than the length of the cylindrical hollow, dielectric, elastic member placed therein. When a dielectric tube having a diameter slightly smaller than the inside diameter of the hollow portion of the elastic member is located in the elastic member and the two portions of the tube holder are secured together, the elastic member is compressed within the sealing chamber forming a liquid and electrical seal.

The present invention will be more easily understood by reference to the drawing. In FIG. 1, first and second holder members 10 and 12, respectively, are to be located in position at locating faces 14 and 16, respectively. There is a recess in each locating face shown by 18a and 18b respectively for members 10 and 12, each of the same diameter and aligned along the same center line. For example, a close tolerance fit between surfaces 11 and 13 can accomplish such an alignment. Together these two recesses form a sealing chamber.

Communicating with the sealing chamber are passages 24 and 26 through members 10 and 12 respectively through which a cathode-tube 25 and a dielectric glass tube 27 can be located. Within the chamber formed by recesses 18a and 18b when assembled is a cylindrical hollow, dielectric, elastic sealing member 28 such as of plastic, for example, Tygon tubing material. The sealing member is aligned with the sealing chamber and has a diameter slightly smaller than that of the sealing chamber to allow a slip fit but of a length A in FIG. 3 greater than the combined depth of recesses 18a and 18b. FIG. 3, which is an enlargement of a portion of FIG. 1, exaggerates the slight or slip fit clearance gap 30 between elastic sealing member 28 and glass tube 27.

When assembled with tube 27, as shown in FIG. 2 and in detail in FIG. 4, elastic member 28 will be compressed to a shorter length B axially as represented by arrows 31. This results in radial compressive forces represented by arrows 33 which are reaction forces from the walls of the sealing chamber. These combinations of forces press member 28 against the outer walls of tube 27 to affect both a fluid and an electrical seal by closing gap 30. As shown in FIG. 2, electrolyte can then be passed through cathode-tube 25 from an electrolyte source (not shown) and then through tube 27 toward workpiece 40 without electrolyte or electric current leakage occurring from the sealing chamber.

The first and second members can be secured together by a variety of means. For example, there can be used a thread arrangement as shown in FIGS. 1 and 2, a nut and bolt arrangement as shown in FIG. 5 or other clamping means to secure members 10 and 12 together.

An advantage in the use of the embodiment shown in FIGS. 1 and 2 is that faces 14 and 16 can be used as locating surfaces along with face 34 of a tube locating cavity 36 of a size large enough to receive the end of tube 27. Upon replacement of tube 27 with one of equal length, the tip 38 of tube 27 opposite an anodic workpiece 40 held by a workpiece holder 42 in FIG. 2 can be maintained in accurate position with respect to the end of cathode 27 as well as with respect to the workpiece 40.

In the embodiment shown in FIG. 5, two tubes 44 and 46 can be joined in relative juxtaposition or abutting relationship employing an elastic member 28 and members 10 and 12 in the manner described before.

By sizing the diameter of the sealing chamber to be large enough to receive a family of hollow flexible, cylindrical dielectric members of the same outside diameter but having a variety of inside diameters, a variety of sizes for tubes 27 can be used with a single holder of the present invention. The compression of the cylindrical hollow, dielectric, elastic member in the manner described before provides an electrolyte and an electrical seal so that the electrolyte and current leakage does not occur.

Although the present invention has been described in connection with specific embodiments, it will be recognized by those skilled in the art the variations and modifications of which the present invention is capable. It is intended by the appended claims to cover all such variations and modifications.

What is claimed is:

1. In an apparatus for use in electrolytic machining of an electrically conductive workpiece, the apparatus including:
   means for connecting the workpiece to make the workpiece predominantly anodic;
   a dielectric tube for directing cathodically charged electrolyte toward the workpiece;
   means for circulating electrolyte through the dielectric tube;
   an electrode contacting the electrolyte circulating through the dielectric tube to charge the electrolyte cathodically;
   means for connecting the electrode to make the electrode predominantly cathodic;
   the improvement comprising a tube holder for the dielectric tube including:
   first and second holder members each having a locating face;
   a cylindrical recess in each locating face, each of the same diameter,
   means to align the first and second holder members so that the cylindrical recesses are aligned one with the other to define a cylindrical sealing chamber;
   a cylindrical, hollow, dielectric, elastic sealing member in the sealing chamber open at both ends, the diameter of the sealing member being sufficiently less than that of the sealing chamber to allow a slip fit between the chamber and the member, the length of the sealing member being greater than the combined depths of the cylindrical recesses;
   means to secure the first and second holder members together to contact the locating faces one on the other and to compress the sealing member axially of the sealing chamber;
   the first holder member having a passage therethrough communicating with the hollow interior of the sealing member within the sealing chamber to receive the dielectric tube; and
   means in the second holder member to direct charged electrolyte into the dielectric tube at a point between the workpiece and the end of the sealing chamber farthest from the workpiece.

2. The improvement of claim 1 in which:
   the recess in the second holder member includes a dielectric tube locating cavity of a diameter less than the outside diameter of the sealing member but greater than the outside diameter of the dielectric tube to receive an end of the dielectric tube which extends through the sealing chamber toward the second member; and
   the means in the second holder member to direct charged electrolyte into the dielectric tube communicates with the dielectric tube locating cavity.

3. The improvement of claim 2 in which the means in the second holder member to direct charged electrolyte into the dielectric tube includes an electrode tube having an outside diameter less than the inside diameter of the dielectric tube and having an open end located within dielectric tube and having an open end located within the dielectric tube.

References Cited
UNITED STATES PATENTS

| | | | |
|---|---|---|---|
| 3,135,677 | 6/1964 | Fischer | 204—290 XR |
| 3,152,057 | 10/1964 | Conger et al. | 204—286 XR |
| 3,272,731 | 9/1966 | Hutchison et al. | 204—286 XR |
| 3,314,875 | 4/1967 | Andrews | 204—224 |

JOHN H. MACK, Primary Examiner

D. R. VALENTINE, Assistant Examiner

U.S. Cl. X.R.

204—143, 286, 297